United States Patent
Meredith et al.

(10) Patent No.: US 10,048,367 B2
(45) Date of Patent: Aug. 14, 2018

(54) TARGET TRACKING CAMERA

(71) Applicant: AT&T Mobility II LLC, Atlanta, GA (US)

(72) Inventors: Sheldon Kent Meredith, Roswell, GA (US); Jeremy Fix, Acworth, GA (US)

(73) Assignee: AT&T Mobility II, LLC, Atlanta, GA (US)

( * ) Notice: Subject to any disclaimer, the term of this patent is extended or adjusted under 35 U.S.C. 154(b) by 451 days.

(21) Appl. No.: 14/812,077

(22) Filed: Jul. 29, 2015

(65) Prior Publication Data

US 2017/0031016 A1    Feb. 2, 2017

(51) Int. Cl.
*G01S 13/72*     (2006.01)
*G01S 13/86*     (2006.01)
*G01S 7/41*      (2006.01)

(52) U.S. Cl.
CPC .............. *G01S 13/867* (2013.01); *G01S 7/411* (2013.01); *G01S 13/72* (2013.01)

(58) Field of Classification Search
CPC ......... G01S 13/72; G01S 13/867; G01S 7/411
USPC .......................................................... 342/52
See application file for complete search history.

(56) References Cited

U.S. PATENT DOCUMENTS

| | | |
|---|---|---|
| 5,072,294 A | 12/1991 | Engle |
| 5,267,014 A | 11/1993 | Prenninger |
| 5,936,723 A | 8/1999 | Schmidt et al. |
| 6,285,959 B1 | 9/2001 | Greer |
| 6,978,167 B2 | 12/2005 | Dekel et al. |
| 8,121,361 B2 | 2/2012 | Ernst et al. |
| 8,625,107 B2 | 1/2014 | Kusik et al. |

(Continued)

FOREIGN PATENT DOCUMENTS

| | | |
|---|---|---|
| AU | 572567 B2 | 5/1988 |
| CA | 2764447 A1 | 12/2010 |

(Continued)

OTHER PUBLICATIONS

Eccles, P. J. "The orientation and construction of high efficiency passive radar targets." Proceedings of the IEEE 53.8 (1965): 11151117, Aug. 1965.

(Continued)

*Primary Examiner* — Timothy A Brainard
(74) *Attorney, Agent, or Firm* — Jackson Walker L.L.P.

(57) ABSTRACT

A target tracking device transmits a radio frequency beam towards a scene, detects backscatter comprising at least a portion of the RF beam reflected from a reflecting object at the scene, and performs operations that include determining whether the reflecting object is a tracking target, determining a position of the tracking target, and generating tracking information indicative of a position adjustment for maintaining an alignment of the target tracking device and the tracking target. A target tracking method includes transmitting a millimeter wavelength beam in a direction of orientation of a camera, detecting backscatter reflected from a reflecting object, determining whether the reflecting object is a tracking target, and determining a position of the tracking target. If a distance to the tracking target has increased from a prior distance, tracking information indicative of a position adjustment for offsetting the increase in distance may be generated.

19 Claims, 4 Drawing Sheets

(56) References Cited

U.S. PATENT DOCUMENTS

| | | |
|---|---|---|
| 8,892,219 B2 | 11/2014 | Pryor |
| 9,008,362 B1 | 4/2015 | Friesel |
| 2002/0144416 A1* | 10/2002 | Ghesla ............... G01C 15/06 33/293 |
| 2003/0098796 A1* | 5/2003 | Bond ................. G01N 21/59 340/627 |
| 2004/0061641 A1* | 4/2004 | Fischer ................ F41G 5/08 342/96 |
| 2005/0115385 A1* | 6/2005 | Rodriguez ........... F41A 33/02 89/1.11 |
| 2007/0106152 A1 | 5/2007 | Kantrowitz |
| 2011/0174917 A1* | 7/2011 | Dold .................. F41G 7/007 244/3.15 |
| 2013/0072225 A1* | 3/2013 | Gaver ................ H04W 24/00 455/456.1 |
| 2013/0141735 A1 | 6/2013 | Sogard |
| 2013/0307719 A1* | 11/2013 | Granet .............. G01S 13/4409 342/153 |
| 2013/0342657 A1* | 12/2013 | Robertson ........... G01S 17/023 348/47 |
| 2015/0244441 A1* | 8/2015 | Aryanfar ............ H04B 7/0671 375/308 |

FOREIGN PATENT DOCUMENTS

| | | |
|---|---|---|
| CA | 2467545 C | 3/2015 |
| CN | 1362611 A | 8/2002 |
| EP | 1419563 A2 | 5/2004 |
| EP | 1873545 A2 | 1/2008 |
| EP | 1998424 A1 | 12/2008 |
| WO | 2008056180 A2 | 5/2008 |
| WO | 2015022100 A1 | 2/2015 |

OTHER PUBLICATIONS

Dror, Itiel E., Mark Zagaeski, and Cynthia F. Moss. "Three dimensional target recognition via sonar: a neural network model." Neural Networks 8.1 (1995): 149160.

Kurihara, Kazutaka, et al. "Optical motion capture system with pantilt camera tracking and realtime data processing." ICRA. 2002.

Zhai, Shumin. "Human performance in six degree of freedom input control." Diss. University of Toronto, 1995.

* cited by examiner

TARGET TRACKING CAMERA

BACKGROUND

Field of the Disclosure

Subject matter disclosed herein is concerned with automated tracking of an object-of-interest by an electronic device.

Description of the Related Art

Lectures, concerts, and other performances are frequently photographed, filmed, or both. In many cases, it may be preferable to maintain a camera recording the event focused on one particular person or on a very small number of persons for the great majority of the performance or event, but a human operator may not be continuously available to operate the camera for the duration of the performance. Although the camera may be able to operate continuously in a fixed position focused on or otherwise aimed at a fixed point, the person or object to be filmed may move from time to time. If the movement is sufficiently great, a fixed position camera will film mere background at times. Moreover, other situations involving other types of direction-oriented devices and their corresponding targets may experience a similar tracking dilemma.

DETAILED DESCRIPTION

Figure 1:
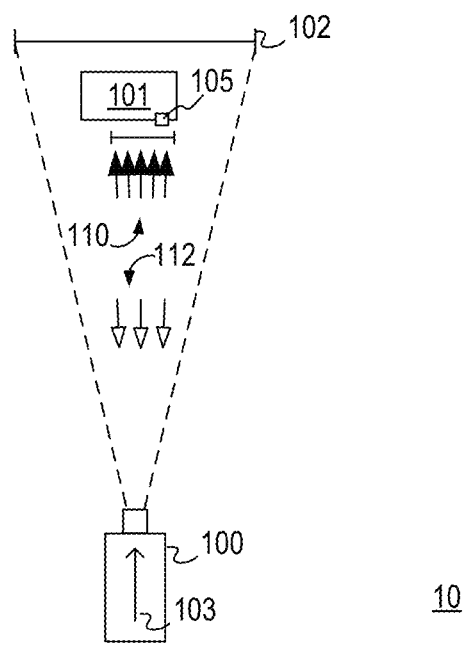
FIG. 1 is a top view of a target tracking device and a scene in which a tracking target is located.

Disclosed target tracking devices include a camera equipped with a lens, a radio frequency (RF) transmitter, an RF receiver, and a closed-loop mounting system that can rotate, aim, or orient the camera direction. The RF transmitter and the RF receiver may be located in very close proximity to the camera lens. The lens focuses light energy from a scene, e.g., a performing stage, onto an image capture medium to create an image. Generally, the lens captures light energy from a portion of the scene that defines the boundaries of the captured image.

The RF transmitter may be configured to generate an RF signal of a suitable wavelength, which may be influenced by a size or dimension of the tracking target. For target tracking applications employing tracking targets that affix to a person's clothing or are otherwise worn by the person, the tracking target may, in one non-limiting example, have a dimension in the range of approximately 10 to 40 mm. An optimal or desirable RF signal wavelength may be approximately ⅕ to ⅓ of the target dimension and a wavelength of the RF signal may be in the range of approximately 4 to 12 mm corresponding to an RF frequency in the range of approximately 25 to 75 GHz. While longer or shorter RF signal wavelengths may be used, longer RF signal wavelengths may require tracking targets that are undesirably large while transmitters for higher frequency signals may struggle to produce sufficiently powerful signals. Because a range of desirable RF wavelengths may be 4 to 12 mm or something comparable thereto, the RF signals referred to herein may refer more specifically to millimeter-wavelength signals and may be referred to herein as mm-wavelength signals.

The RF transmitter may scan an RF signal over a field with a defined width to generate an RF beam. The RF beam may be relatively narrow with respect to an object-of-interest located at the scene. The use of a relatively narrow RF beam may maintain the object-of-interest "centered" within the scene captured by the camera lens, but may require more frequent adjustment of the camera. If the object-of-interest is a performer on stage, for example, movement of the performer greater than the beam width in either direction would trigger a repositioning of the camera. A wider RF beam may exchange reduced "centering" for less frequent camera tracking adjustments. For example, if an RF beam width approximates the dimension of the scene captured by the camera lens, the target tracking camera may maintain its position as long as the object remains within the captured scene, adjusting position only when the object moves out of the scene entirely.

The RF receiver may be configured to detect backscatter, i.e., portions of the RF beam reflected back to the RF beam source, reflected from objects and surfaces in the path of the RF beam. Reflective "tracking targets" may be affixed to, placed on, or placed in proximity to an object-of-interest located within the scene. If the object is a public speaker, as an example, a tracking target may be pinned to or otherwise affixed to the speaker or clothes worn by the speaker. In this manner, the target tracking camera, by tracking the tracking target, automatically tracks the object-of-interest.

In at least one embodiment, tetrahedral corner reflectors are employed as tracking targets. Tetrahedral corner reflectors beneficially facilitate object location and target tracking by reflecting at least some portion of incident RF signals towards the light source independent of the angle of incidence, i.e., the path of incidence and the path of reflection are parallel. This characteristic of a tetrahedral target results in targets that "flash" when reflecting an RF signal substantially regardless of the angle of incidence.

In some embodiments, the RF beam width is dynamically adjustable. The RF beam width may be adjusted in accordance with various parameters including, as non-limiting examples, the dimension of the tracking target, the dimension of the scene captured by the camera, and a dimension of the object-of-interest. In at least one embodiment, the target tracking device may increase the beam width when searching for a tracking target that has moved. For example, if the target tracking device has been unable to locate the tracking target and a specific interval of time has elapsed, the target tracking device may increase the size of the beam.

In some cases, foreign objects, which may be naturally occurring, randomly encountered objects, function as tracking targets by backscattering RF and thereby provide a false signal to the receiver. A target detection module may be configured to address this possibility by transmitting and monitoring backscatter associated with two or more RF signal components of different frequencies. A naturally occurring tetrahedral object will generally exhibit some degree of reflectivity across a band of frequencies in the applicable range and backscatter both of them, though it may backscatter one frequency better than the other. An RF filtering material may be used in conjunction with the intended tracking target to identify the intended tracking target to the receiver.

The RF beam may include two or more components and the tracking target may be highly reflective with respect to a first component and highly non-reflective of a second component. The use of an RF beam with multiple components may facilitate detection of a tracking target and may improve the tracking device's ability to distinguish an intended tracking target from any unintended targets, whether naturally occurring, randomly encountered, or deliberately introduced into the scene.

The multiple components may include signals having different frequencies. The tracking target may be coated with or located behind a film or layer of material that passes a first frequency without any substantial filtering while absorbing or blocking substantially all of a second RF signal having a second frequency. The different components of an RF signal may also refer the RF beam at different times. For example, the RF beam may be pulsed on and off with a particular pattern. After detecting a target tracking candidate, e.g., a target that flashes when the first component is received, the target tracking system may verify the tracking target candidate by observing the backscatter produced by the target in response to a second component having a second frequency and wavelength or by monitoring the candidate target for a particular time-dependent flashing pattern.

Accordingly, in at least one aspect, disclosed subject encompasses a target tracking camera or another type of target tracking device that includes a transmitter configured to transmit a radio frequency beam towards a scene, a receiver configured to detect backscatter comprising at least a portion of the RF beam reflected from a reflecting object, and a controller. The controller may be configured to perform operations including: determining whether the reflecting object is a tracking target, determining a position of the tracking target, and generating tracking information indicative of a position adjustment for maintaining an alignment of the target tracking device and the tracking target.

The transmitter may generate an RF signal and may include a scanning mechanism to scan the RF signal over a field of a particular width to generate the beam. A wavelength of at least one component of the RF beam is in the range of approximately 4 to 12 mm and the corresponding frequency is in the range of approximately 25 GHz to 75 GHz. A dimension of the tracking target and the wavelength of the RF signal may have a particular ratio between approximately 3 and approximately 5 to achieve sufficient tracking target reflectivity.

The tracking information may be used to adjust a position of the target tracking device to reduce a displacement or angular offset between the camera and the tracking target. Adjusting the position of the target tracking device may include signaling one or more actuators coupled to the target tracking device to adjust the tracking device position in accordance with the tracking information. The target tracking device may include a target tracking camera that includes an exposure medium, and a lens configured to focus light from the scene onto the exposure medium to record an image of the scene in the exposure device.

The target tracking device may take action when a lack of backscatter or insufficient backscatter is detected by performing one or more of the following operations: reducing a magnification of the lens, i.e., zooming out; adjusting a position of the target tracking device; and increasing a width of the RF beam. The tracking target may be configured as a tetrahedral or other form of retroflector that reflects RF signals back to their source, i.e., the path of incidence and the path of reflection are parallel or substantially parallel for a wide range of angles of incidence.

The RF beam may include a first component and a second component, and determining whether a reflecting object is a tracking target may include determining that the tracking target reflects the first component of the RF beam, the first component having a first frequency, and determining that the tracking target filters a second component of the light beam, the second component having a second frequency.

The target tracking device may include functionality, based on a rule set or otherwise, for identifying false identifications of a tracking target. As one non limiting example, the target tracking device may determine, in addition to the position of a tracking target or tracking target candidate, the change of position from a prior position, a rate of position change including, as examples, angular or translational velocity of a tracking target. If any one or more of these parameters exceeds a threshold maximum, the target tracking device may re-compute the position or reduce, dampen, cancel, or otherwise throttle any positional change of the system. As another example, the target tracking device may reject a tracking target candidate as a tracking target or reverse a previous determination of a tracking target candidate as a tracking target upon detecting a polarization change in backscatter from the applicable target.

In another aspect, a disclosed target tracking camera includes an exposure medium, a camera lens oriented towards a scene and configured to focus light from the scene on the exposure medium, a scanning transmitter to transmit a radio frequency beam toward a direction of orientation of the camera, a receiver to detect backscatter comprising at least a portion of the RF beam reflected from a reflecting object, and a controller. The controller may be configured to execute program instructions or to perform various operations including, as examples, determining whether a reflecting object is a tracking target in response to detecting sufficient backscatter from the reflecting object, determining a position of the tracking target upon determining the reflecting object is a tracking target, and, generating tracking information indicative of a position adjustment for maintaining the tracking target within the scene.

In another aspect, a disclosed target tracking method includes transmitting a millimeter wavelength beam toward a direction of orientation of a camera, detecting backscatter comprising at least a portion of the RF beam reflected from a reflecting object, and determining whether the reflecting object is a tracking target. Responsive to determining the reflecting object is a tracking target, a position of the tracking target may be determined. Responsive to determining that a distance between the tracking target and a target tracking device has increased from a prior distance, tracking information indicative of a positional adjustment of the target tracking device may be generated for offsetting the increase in distance.

Referring now to the drawings, in which like reference numerals correspond to like elements, FIG. 1 is a top view illustrating aspects of a target tracking environment 10 in which a target tracking device 100 is configured to track an object-of-interest 101 to which a tracking target 105 is attached, in accordance with subject matter disclosed herein. Target tracking device 100 encompasses any directionally-oriented device associated with an object-of-interest wherein it is necessary or desirable to adjust the orientation of the device in accordance with a position of the object-of-interest as the object of interest moves about. For purposes of clarity and brevity, the figures included herein and the corresponding descriptions emphasize a still image or video camera as the target tracking device 100 and the camera may be referred to herein as camera 100 without prejudice to the use of other devices as target tracking device 100.

The camera 100 illustrated in FIG. 1 may be a single lens reflex (SLR) camera or another type of still image or video camera. The camera 100 illustrated in FIG. 1 has or is associated with an orientation direction suggested by the directional indicator 103. In at least one embodiment, camera 100 supports a target tracking mode in which camera 100 generates an RF beam 110 and directs it in the direction of orientation 103 to a scene 102 toward which camera 100 is oriented. An object-of-interest 101, sometimes referred to herein simply as object 101, is illustrated positioned within scene 102. Object 101 may refer to any animate or inanimate object, including a person, located at the scene 102, but object 101 may emphasize the particular person or object as the focal point of attention including, as non-limiting examples, a performer on stage or a speaker at a podium.

Object 101 may move about within scene 102, such as when a performer moves about on stage during a performance. If movement of object 101 results in object 101 being positioned outside of the scene 102, camera 100 will not be able to capture an image that includes object 101 unless camera 100 is either zoomed out to increase the extent of scene 102 captured by camera 100, or physically moved, whether by rotation, translation, or a combination of both, from an initial position to an adjusted position in which object 101 is positioned within the scene 102 captured by camera 100. Camera 100 includes functionality and corresponding structural features enabling camera 100 to move and thereby maintain orientation with respect to object 101 so that object 101 remains within the scene 102 captured by camera 100.

In at least one embodiment, camera 100 tracks the position of object 101 by tracking the position of a tracking target 105 attached to or in close physical proximity to object 101. Tracking target 105 may exhibit substantial reflectivity for an RF signal of at least one wavelength. Tracking target 105 may also be a retroflector device that reflects RF signals back to their source. Retroflector configurations of tracking target 105 beneficially simplify target tracking by reflecting RF signals back to their source and thereby eliminating the angle of incidence as a variable in a target identification procedure Tracking target 105 may also be configured to be non-reflective with respect to other wavelengths of RF. The substantial reflectivity of tracking target 105 at the first wavelength facilitates tracking of tracking target 105 while the lack of reflectivity of the target with respect to one or more other wavelengths may be used to distinguish the actual target from false targets, which may exhibit a different reflectivity signature than the intended target. False targets may include randomly encountered or naturally occurring false targets as well as deliberately false targets intended to defeat or confuse target tracking features of camera 100.

Target tracking device 100 may support a manual override feature enabling an operator to take manual control of tracking a target. In at least one embodiment, target tracking device 100 may support a rule set that takes into account a maximum possible rate of change of location of the target in either plane. For example, if the target can't possibly move at a rate faster than 3 degrees per second, large and sudden angular changes could be mitigated. This feature may beneficially address the finite possibility that both of the transmitted signals could reflect off of an unintended object bi-directionally and cause a false reading. It is also possible that one could detect sudden changes in polarization of the backscattered signals as part of a scoring method to eliminate false reading from unintended reflectors.

FIG. 1 illustrates an RF beam 110 transmitted by camera 100, in parallel with an orientation of camera 100, towards the scene 102 upon which camera 100 is focused. The RF beam 110 may have a beam width ranging anywhere from a relatively narrow width, e.g., a beam width of approximately 300 mm, to a beam width that equals or even exceeds a width of the scene 102 captured by the camera 100. The width of scene 102 may be a function of the camera's optics, the distance between camera 100 and scene 102, and camera settings including, as non-limiting examples, a zoom or focus setting, an aperture setting, a shutter speed, and so forth.

Camera 100 may include scan control features that implement the scanning mechanism used to generate the RF beam. In some embodiments, scanning mechanism may include mechanical elements, e.g., a rotating mirror system analogous to missile seeking systems. In some embodiments, electro-optic scanning mechanisms are used and the RF beam is "pointed" by steering a wavefront of a coherent RF signal using phased array concepts. In some embodiments, electronic modulation of the index of refraction of a crystalline material is employed to steer a wavefront, by modifying its phase velocity and a time delay of the signals passing through. In some embodiments, millimeter-wave wavefronts are steered by voltage controlled modulation of reactive components such as varactor diodes.

In conjunction with a direction controllable RF beam 110, FIG. 1 illustrates RF backscatter or "backflash" 112 from one or possibly multiple tetrahedral or other tracking targets, e.g., tracking target 105 located at scene 102. When a receiver of target tracking camera 100 detects and locates the source of RF backscatter 112, information indicative of the position of tracking target 105 relative to the orientation of target tracking camera 100 may be generated and used, in conjunction with one or more mechanical, pneumatic, electrical, or other type of translation or rotational actuators, to modify a position of the target tracking device 100 to maintain alignment with the tracking target(s) 105, i.e., maintain tracking target 105 within the scene 102 associated with target tracking camera 100.

Figure 2A:
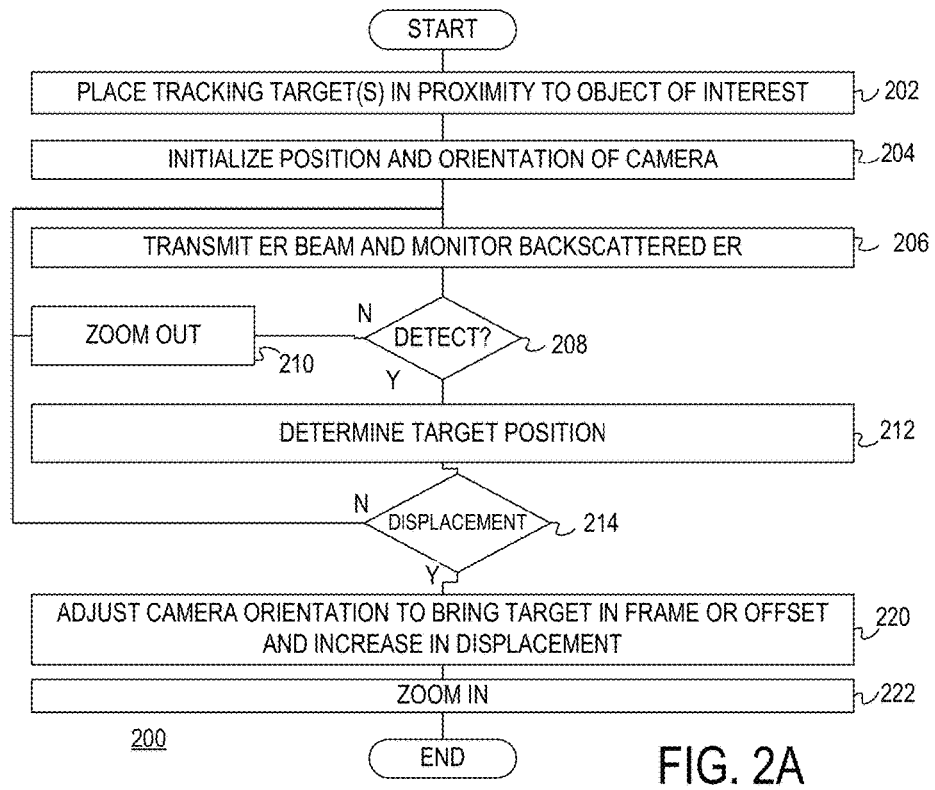
FIG. 2A illustrates a target tracking method.

FIG. 2A illustrates an example method 200 of operation for a target tracking device such as the target tracking device 100 of FIG. 1. The illustrated method 200 includes placing (block 202) tracking targets in proximity to an object-of-interest and initializing (block 204) a position and orientation of a target tracking camera or other target tracking device. The target tracking device may transmit (block 206) an RF beam towards a scene and monitor backscatter reflected back from one or more intended or unintended backscatter targets located in the scene.

A target detection operation (block 208) is performed to determine if the backscatter monitored in block 206 indicates the presence of a tracking target. The target detection operation in block 208 may include operations illustrated in greater detail with respect to FIG. 2B including operations for verifying whether backscatter originates from an actual tracking target or from an unintended target.

If the target detection operation 208 identifies a tracking target, the method 200 illustrated in FIG. 2A proceeds to block 212. If target detection operation 208 does not identify a tracking target, method 200 may zoom out (block 210) or otherwise increase the extent of the scene being monitored in an attempt to bring the tracking target into the field of view of camera 100. In other embodiments, operation 200 may include increasing the width of the RF beam or taking other action to find a tracking target not currently in view.

Returning to FIG. 2A, if the tracking target is detected at block 208, the illustrated method 200 includes determining the position of the tracking target at block 212. Position determination may include determining an offset angle that represents any difference between the direction of orientation of the target tracking device and direction associated with the position of the tracking target. For example, an offset angle of 0 might indicate that the tracking target is centered within the scene 102 currently captured by the target tracking camera.

After determining the target position in block 212, the method 200 illustrated in FIG. 2A determines, at block 214, whether a displacement associated with the target is sufficient to adjust the target tracking camera. Displacement may be indicated by any differences between the current position of the tracking target and previous positions of the tracking target. Differences in tracking target position may include differences in offset angles, differences in displacement or distance, or a combination of the two. Differences between a current position and a previous position may be significant if the net result is an increase in tracking target displacement.

If the tracking target displacement is less than the most recently determined displacement or if the displacement is less than a specific threshold, the method 200 illustrated in FIG. 2A returns to block 206 where transmitting the RF beam and monitoring backscatter continue. If operation 214 determines that the current tracking target displacement is greater than a previously determined displacement 214 or if the current displacement exceeds a particular maximum threshold value, the method 200 illustrated in FIG. 2A adjusts (block 220) the camera orientation and/or position to offset the increase in or otherwise reduce the tracking target displacement. To the extent that method 200 includes zooming out in block 210, the method 200 may also include zooming in the camera at block 222 following a repositioning of the camera.

Figure 2B:
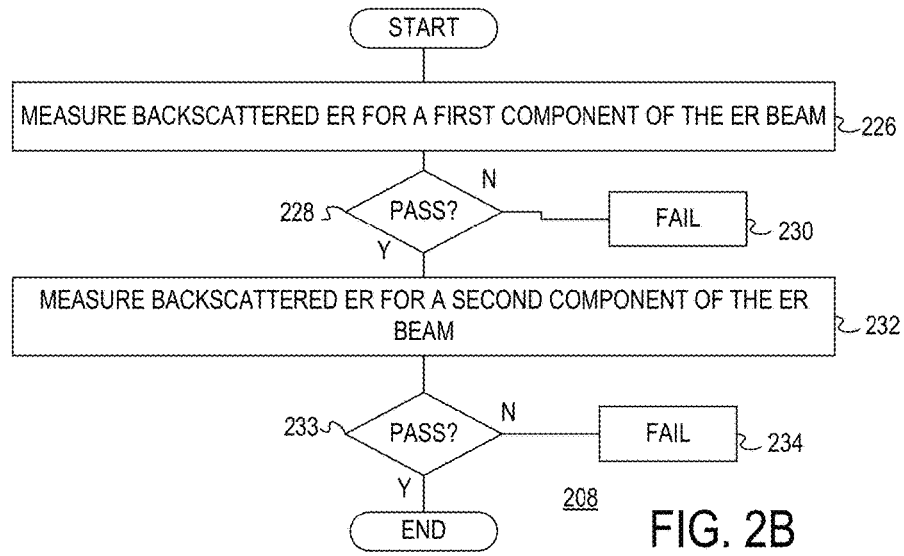
FIG. 2B illustrates a tracking target determination method.

FIG. 2B illustrates operations associated with an example method of the detection determination represented by block 208 of FIG. 2A, in which the target tracking device determines whether backscatter originates from an intended tracking target or represents a false signal. The detection determination 208 illustrated in FIG. 2B includes measuring (block 226) backscatter corresponding to a first component of an RF signal and determining whether the measured backscatter RF passes a first component criteria in block 228. The first component criteria may be a minimum threshold criteria that passes when the candidate tracking target has a reflectivity exceeding a minimum threshold. The generating of the RF beam 110 may include scanning two or more RF signals, each of which has its own corresponding frequency.

If the measured backscatter associated with the first component of the RF beam passes the criteria at block 228, the illustrated method 208 includes measuring backscatter for a second component of RF beam 110 at block 232 and determining, in block 233, whether the measured backscatter for the second signal passes or fails (block 234) a second component criteria. In at least one embodiment, measuring backscatter for the second component of the RF includes comparing the backscatter associated with the second component against a threshold criteria wherein the criteria is satisfied if the second component backscatter RF is less than the threshold. The detecting method 208 illustrated in FIG. 2B distinguishes between naturally occurring, randomly encountered, or intentionally deceptive false targets positioned near the object-of-interest 101 by recognizing a reflectivity signature associated with intended tracking targets. In the example of FIG. 2B, the reflectivity signature indicates reflectivity at a first frequency and no activity for a second frequency. A reflectivity signature of this type may be implemented by coating or otherwise treating the tracking target with a film or material that reflects RF at the first frequency and absorbs or does not substantially reflect at the second frequency.

Figure 5:
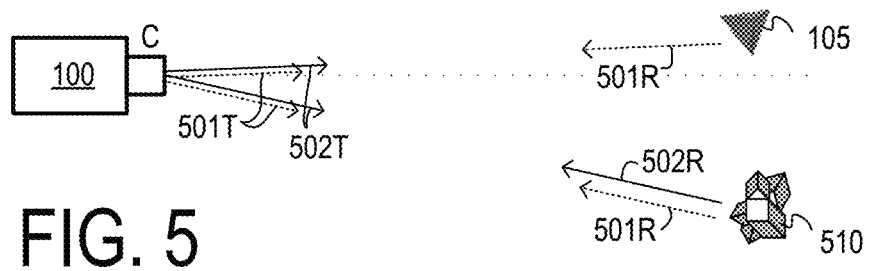
FIG. 5 illustrates a distinction between a reflectivity signature generated by an intended tracking target and a false tracking target.

Example reflectivity signatures for intended and false targets are illustrated in FIG. 5, wherein tracking device 100 transmits an RF beam that includes a first component 501T and a second component 502T. Backscatter from a naturally occurring reflecting object 510 that represents a false tracking target includes components 501R and 502R corresponding to both of the transmitted components whereas intended tracking target 105, illustrated as a regular tetrahedral tracking target, generates backscatter for only one of the two transmitted component signals. In other embodiments, a reflectivity pattern might also refer to a time-based reflectivity differentiation in which the tracking target is reflective for a first interval and non-reflective for a second interval. An active-power tracking target, as an example, may be configured to exhibit reflectivity with respect to one or more frequencies during a first interval and to exhibit no or substantially no frequency with respect to one or more frequencies during a second interval.

Figure 3:
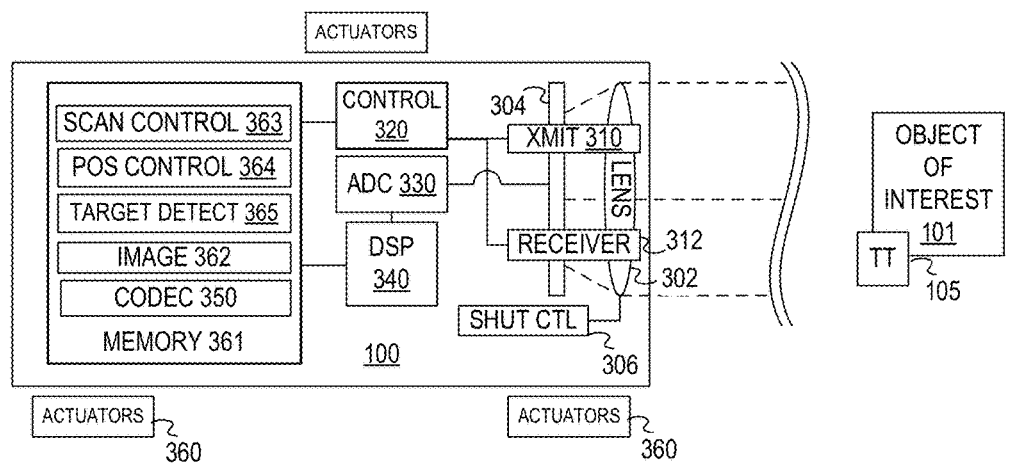
FIG. 3 illustrates a block diagram of a target tracking camera.

FIG. 3 illustrates selected elements of a camera 100 suitable for use as a target tracking device in accordance with subject matter disclosed herein. The camera 100 illustrated in FIG. 3 includes a lens 302 that focuses light from an object-of-interest 101 onto an exposure medium or another type of image forming medium such as the charge coupled device (CCD) 304. CCD 304 may include a capacitor array that functions as a photoactive region or exposure medium. An image projected through lens 302 onto the capacitor array may cause each array capacitor to accumulate an electric charge proportional to the light intensity at that location. Once the array has been exposed to the image, a control circuit may cause each capacitor to transfer its contents to its neighbor (operating as a shift register). By repeating this process, the controlling circuit converts the array contents to a sequence of voltages.

In a digital camera, these voltages may be sampled and digitized by analog-to-digital converter (ADC) 330, decompressed or decrypted by digital signal processor 340 and stored as an image 362 in memory 361. In an analog device (such as an analog video camera), these voltages are processed into a continuous analog signal (e.g., by feeding the output of the charge amplifier into a low-pass filter), which is then processed and fed out to other circuits for transmission, recording, or other processing.

The camera 100 of FIG. 3 includes a shutter control mechanism 306 to operate a shutter that prevents or permits exposure of CCD 304 to light. The depicted camera 100 includes an RF transmitter 310 and an RF receiver 312 that are coupled to a controller 320. The CCD 304 is illustrated coupled to an ADC 330 and a digital signal processor 340. The digital signal processor 340 may operate in conjunction with a coder/decoder (CODEC) 350 that may be used to decrypt, decompress, or both video contents. Camera 100 as shown further includes actuators 360 which may be controlled by controller 320 to rotate or otherwise alter the orientation of camera 100.

Controller 320 may perform operations by executing instructions stored in memory 361, which is accessible to controller 320. The memory 361 illustrated in FIG. 3 includes a scan control module 363, a position control module 364, and a target detection module 365. In some embodiments, controller 320 executes scan control module 363 to control the scanning of a radio frequency signal generated by transmitter 310 to create the RF beam 110 (see FIG. 1). Controller 320 may execute target detection module 365 to determine whether backscatter from a reflecting object constitutes a tracking target. Target detection module 365 may include instructions to distinguish false tracking target candidates from intended tracking targets using dual frequency RF signals. Target detection module 365 may also determine a position or displacement associated with a tracking target. Position control module 364 may generate tracking information based on the position or displacement of the tracking target. The tracking information may indicate any positional and or angular adjustment of tracking device 100 needed or desired to maintain target tracking device 100 in alignment with the tracking target by, as one example, maintaining the tracking target within the scene captured by lens 302. Position control module 364 may communicate to the actuators 360 or another suitable device positioning resource to effectuate the necessary or desired adjustment of target tracking device 100.

Figure 4:
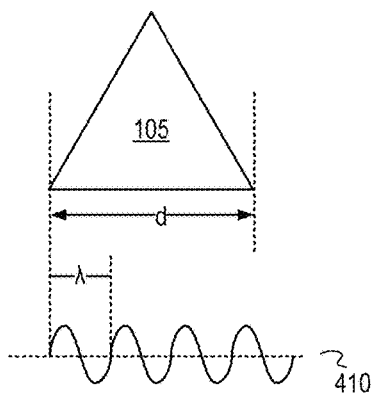
FIG. 4 illustrates a tracking target.

FIG. 4 illustrates a side view of a tetrahedral tracking target 105 adjacent to an illustration of an exemplary signal or component 410 of the RF beam 110 generated by the RF transmitter 310. The RF signal 410 illustrated in FIG. 4 has a wavelength $\lambda$ and the tetrahedral tracking target 105 has a dimension, d. FIG. 4 illustrates instances of $\lambda$ and d with a ratio of tracking target dimension, d, to wavelength, $\lambda$, of approximately 3 or 4 to 1. In at least some embodiments, the tracking target dimension, d, is in the range of approximately 3 to 5 times, the wavelength $\lambda$ of RF signal 410. For target tracking applications employing tracking targets 105 that affix to a person's clothing or are otherwise worn by the person, the tracking target may, in one non-limiting example, have a dimension in the range of approximately 10 to 40 mm. An optimal or desirable wavelength $\lambda$ of RF signal 410 may be approximately ⅓ of the tracking target dimension, d, and the wavelength $\lambda$ of the RF signal 410 may be in the range of approximately 4 to 12 mm, corresponding to a frequency of RF signal 410 in the range of approximately 25 to 75 GHz. As described previously, RF transmitter 310 may scan RF signal 410 over a field having a defined width to generate a defined-width RF beam 110. In one non-limiting example, an RF beam 300 mm (~12 inches) in width may be used to tract a mm-sized target affixed to a particular person of interest.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A target tracking device, comprising:
 a transmitter configured to transmit a radio frequency beam towards a scene wherein the radio frequency beam includes a first component and a second component;
 a receiver configured to detect backscatter comprising at least a portion of the radio frequency beam reflected from a reflecting object; and
 a controller configured to perform operations, comprising:
  determining whether the reflecting object is a tracking target;
  determining a position of the tracking target; and
  generating tracking information indicative of a position adjustment for maintaining an alignment of the target tracking device and the tracking target;
 wherein determining whether the reflecting object is a tracking target includes:
  determining that the tracking target reflects the first component of the radio frequency beam, the first component having a first frequency; and
  determining that the tracking target filters the second component of the radio frequency beam, the second component having a second frequency.

2. The target tracking device of claim 1, wherein the transmitter is configured to generate a radio frequency signal and scan the radio frequency signal over a field having a particular width to generate the radio frequency beam.

3. The target tracking device of claim 2, wherein a ratio of a dimension of the tracking target to the wavelength of the radio frequency signal is in the range of approximately 3:1 to approximately 5:1.

4. The target tracking device of claim 1, wherein a wavelength of at least one component of the radio frequency beam is in the range of approximately 4 to 12 mm.

5. The target tracking device of claim 1, wherein the operations include:
 adjusting a position of the target tracking device in accordance with the tracking information.

6. The target tracking device of claim 5, wherein adjusting the position of the target tracking device includes signaling one or more actuators coupled to the target tracking device to adjust the position of the target tracking device in accordance with the tracking information.

7. The target tracking device of claim 1, wherein the target tracking device comprises a target tracking camera, including:
 an exposure medium; and
 a lens configured to focus light from the scene onto the exposure medium to record an image of the scene in the exposure medium.

8. The target tracking device of claim 7, wherein the operations include:
 responsive to detecting a lack of backscatter or insufficient backscatter, performing at least one of a group of operations comprising:
  reducing a magnification of the lens;
  adjusting a position of the target tracking device; and
  increasing a width of the radio frequency beam.

9. The target tracking device of claim 1, wherein the backscatter comprises a portion of the radio frequency beam reflected from a retroreflector target.

10. The target tracking device of claim 9, wherein the backscatter comprises a portion of the radio frequency beam reflected from a tetrahedral retroreflector.

11. The target tracking device of claim 1, wherein the tracking target is coated with film configured to filter the second frequency.

12. The target tracking device of claim 1, wherein determining the position of the tracking target includes determining a change of position and wherein the operations include:
 responsive to the change of position exceeding a maximum threshold, modifying or re-generating the tracking information.

13. The target tracking device of claim 1, wherein determining whether the reflecting object is a tracking target includes:
 determining that the reflecting object is not a tracking target responsive to detecting a polarization change in the backscatter.

14. A target tracking camera comprising:
an exposure medium;
a camera lens oriented towards a scene and configured to focus light from the scene on the exposure medium to record an image of the scene in the exposure medium;
a scanning transmitter to transmit a radio frequency beam toward a direction of orientation of the camera;
a receiver to detect backscatter comprising at least a portion of the radio frequency beam reflected from a reflecting object;
a controller; and
a computer readable medium including program instructions that, when executed by the controller, cause the controller to perform operations including:
responsive to detecting insufficient backscatter, performing at least one of a group of operations comprising:
reducing a magnification of the lens;
adjusting a position of the target tracking device; and
increasing a width of the radio frequency beam
responsive to detecting sufficient backscatter, determining whether the reflecting object is a tracking target;
responsive to determining the reflecting object is a tracking target, determining a position of the tracking target; and
generating tracking information indicative of a position adjustment for maintaining the tracking target within the scene.

15. The target tracking camera of claim 14, wherein the radio frequency beam includes a first component and a second component and wherein determining whether the reflecting object is a tracking target includes:
determining that the tracking target reflects the first component of the radio frequency beam, the first component having a first frequency; and
determining that the tracking target filters the second component of the radio frequency beam, the second component having a second frequency.

16. The target tracking camera of claim 14, wherein a wavelength of at least one component of the radio frequency beam is in the range of approximately 4 to 12 mm and further wherein a ratio of a dimension of the tracking target to the wavelength of the radio frequency beam is in the range of approximately 3:1 to approximately 5:1.

17. The target tracking camera of claim 14, wherein the operations include:
adjusting a position of the target tracking camera in accordance with the tracking information.

18. A target tracking method, comprising:
transmitting a millimeter wavelength beam toward a direction of orientation of a camera;
detecting backscatter comprising at least a portion of the millimeter wavelength beam reflected from a reflecting object;
determining whether the reflecting object is a tracking target;
responsive to determining the reflecting object is a tracking target, determining a position of the tracking target; and
responsive to determining from the position of the tracking target that a distance to the tracking target has increased from a prior distance, generating tracking information indicative of a position adjustment for offsetting the increase in distance;
wherein determining whether the reflecting object is a tracking target includes:
determining that the tracking target reflects a first component of the radio frequency beam, the first component having a first frequency; and
determining that the tracking target filters a second component of the radio frequency beam, the second component having a second frequency.

19. The target tracking method of claim 18, further comprising:
responsive to receiving the tracking information, adjusting a position of the target tracking device to offset the increase in distance.

* * * * *

UNITED STATES PATENT AND TRADEMARK OFFICE
CERTIFICATE OF CORRECTION

| | |
|---|---|
| PATENT NO. | : 10,048,367 B2 |
| APPLICATION NO. | : 14/812077 |
| DATED | : August 14, 2018 |
| INVENTOR(S) | : Meredith et al. |

It is certified that error appears in the above-identified patent and that said Letters Patent is hereby corrected as shown below:

On the Title Page

Item (73), under "Assignee", delete "AT&T Mobility II, LLC" and insert -- AT&T Mobility II LLC --, therefor.

Signed and Sealed this
Second Day of October, 2018

Andrei Iancu
*Director of the United States Patent and Trademark Office*